(12) United States Patent
Lum

(10) Patent No.: US 7,724,642 B2
(45) Date of Patent: May 25, 2010

(54) METHOD AND APPARATUS FOR CONTINUOUS OPERATION OF A POINT-OF-SALE SYSTEM DURING A SINGLE POINT-OF-FAILURE

(75) Inventor: Jackson Lum, Roslyn, NY (US)

(73) Assignee: Logic Controls, Inc., New Hyde Park, NY (US)

( * ) Notice: Subject to any disclaimer, the term of this patent is extended or adjusted under 35 U.S.C. 154(b) by 1036 days.

(21) Appl. No.: 10/912,982

(22) Filed: Aug. 6, 2004

(65) Prior Publication Data

US 2006/0028978 A1    Feb. 9, 2006

(51) Int. Cl.
*H04J 3/14* (2006.01)

(52) U.S. Cl. ............... 370/216; 714/4; 714/7; 714/13

(58) Field of Classification Search ......... 370/216–222, 370/225–228; 714/4, 7, 13
See application file for complete search history.

(56) References Cited

U.S. PATENT DOCUMENTS

| | | | |
|---|---|---|---|
| 4,596,012 A | 6/1986 | Reed | |
| 4,701,756 A | 10/1987 | Burr | |
| 5,448,723 A * | 9/1995 | Rowett | ........................... 714/4 |
| 5,633,999 A | 5/1997 | Clowes et al. | |
| 5,933,591 A | 8/1999 | Mazzurco | |
| 6,240,082 B1 | 5/2001 | Kim et al. | |
| 6,292,905 B1 * | 9/2001 | Wallach et al. | .................. 714/4 |
| 6,347,075 B1 * | 2/2002 | Barzegar et al. | ............ 370/228 |
| 6,550,018 B1 | 4/2003 | Abonamah et al. | |
| 6,604,030 B1 | 8/2003 | Davis et al. | |
| 6,639,895 B1 | 10/2003 | Helles et al. | |
| 7,069,468 B1 * | 6/2006 | Olson et al. | ..................... 714/7 |
| 2001/0056554 A1 * | 12/2001 | Chrabaszcz | .................. 714/13 |
| 2004/0037219 A1 * | 2/2004 | Shaffer et al. | ................ 370/217 |
| 2006/0028991 A1 * | 2/2006 | Tan et al. | ..................... 370/237 |

\* cited by examiner

*Primary Examiner*—Albert T Chou
(74) *Attorney, Agent, or Firm*—Hoffman & Baron, LLP

(57) ABSTRACT

A computer network includes servers, controllers, and a plurality of workstations. The servers and controllers are coupled by Ethernet and secondary communication links. The workstations are serially coupled with the controllers. In this network, each server and controller acts as a failsafe and is adapted to assume the functionality of another server or controller in response to failure in that server or controller. In this manner, the secondary communication link assumes functionality of the Ethernet link in response to failure in the Ethernet link. A method of eliminating interruptions in a computer network due to a single point-of-failure includes assuming functionality of a server or controller by another server or controller in response to failure in the server or controller, and assuming functionality of an Ethernet link by a secondary communication link in response to failure in the Ethernet link.

36 Claims, 6 Drawing Sheets

METHOD AND APPARATUS FOR CONTINUOUS OPERATION OF A POINT-OF-SALE SYSTEM DURING A SINGLE POINT-OF-FAILURE

BACKGROUND OF THE INVENTION

1. Field of the Invention

The present invention relates generally to computer networks and more specifically relates to a method and apparatus for continuous operation of a point-of-sale system during the occurrence of a single point-of-failure.

2. Description of the Related Art

Reliability is paramount in computer network systems, such as point-of-sale systems, which are commonly used in retail sale operations. A primary source of network failure is cable breakage or faulty contacts associated with connectors. FIG. 1 shows a conventional computer network system, in which a server 10 preferably communicates through an Ethernet hub 12 and a control unit or controller 14 to each of a plurality of workstations 16A-16C. The control unit 14 preferably communicates with the workstations through a transmit path 22 and a receive path 24. In a point-of-sale system, the workstations 16A-16C are coupled to a monitor 18 and a keyboard or bump bar 20.

Data is transmitted from the server 10 to the Ethernet hub 12 and then to the control unit 14, which outputs the data on the transmit path 22. The transmit path 22 serially connects each of the plurality of workstations 16A-16C in a daisy-chain configuration. Likewise, data is transmitted from one or more of the plurality of workstations 16A-16C on the receive path 24, which connects the plurality of workstations 16A-16C to the control unit 14. The control unit 14 outputs data received from the workstations 16A-16C to the server 10 through the Ethernet hub 12.

If there is a break in the transmit path 22, at for instance point A, workstation 16C, which is located beyond the break, will not receive information from the control unit 14. Likewise, if there is a break in the receive path 24, at for instance point B, neither the control unit 14 nor the server 10 will receive information from workstations 16A-16C. Malfunctions in the server 10, control unit 14, and Ethernet link would likely result in even more catastrophic communication failures.

Accordingly, it is a goal of the method and system in accordance with the present invention to provide uninterrupted access to all workstations in a point-of-sale system despite the occurrence of a single point-of-failure in the network or malfunctions in the server, control unit, and Ethernet link.

SUMMARY OF THE INVENTION

The foregoing goals are satisfied in accordance with the present invention, which, in one embodiment, provides a computer network including a first server, first controller, second server, second controller, and a plurality of workstations. The servers and controllers are coupled to each other through an Ethernet link and one or more secondary communication links. The plurality of workstations are coupled to each other and the controllers in a serial configuration.

Each of the servers is adapted to assume at least a portion of the functionality of another server in response to a failure in the operation of the other server. Likewise, each of the controllers is adapted to assume at least a portion of the functionality of another controller in response to a failure in the operation of the other controller. The secondary communication link is adapted to assume at least a portion of the functionality of the Ethernet link in response to a failure in the Ethernet link.

Another embodiment of the present invention provides a method of eliminating interruptions in the operation of a computer network due to a single point-of-failure, which includes providing a first server, coupling a first controller to the first server, and coupling a second server to the first server. The method also includes assuming at least a portion of the functionality of the first server by the second server in response to a failure in the operation of the first server, assuming at least a portion of the functionality of the second server by the first server in response to a failure in the operation of the second server, and coupling a plurality of workstations to each other and the first controller in a serial configuration.

The method may further include the steps of coupling a second controller to the second server, and coupling the second controller to the first controller. The method may also include assuming at least a portion of the functionality of the first controller by the second controller in response to a failure in the operation of the first controller, assuming at least a portion of the functionality of the second controller by the first controller in response to a failure in the operation of the second controller, and coupling the plurality of workstations being to each other, the first controller, and the second controller in a serial configuration.

These and other purposes, goals, and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 1:
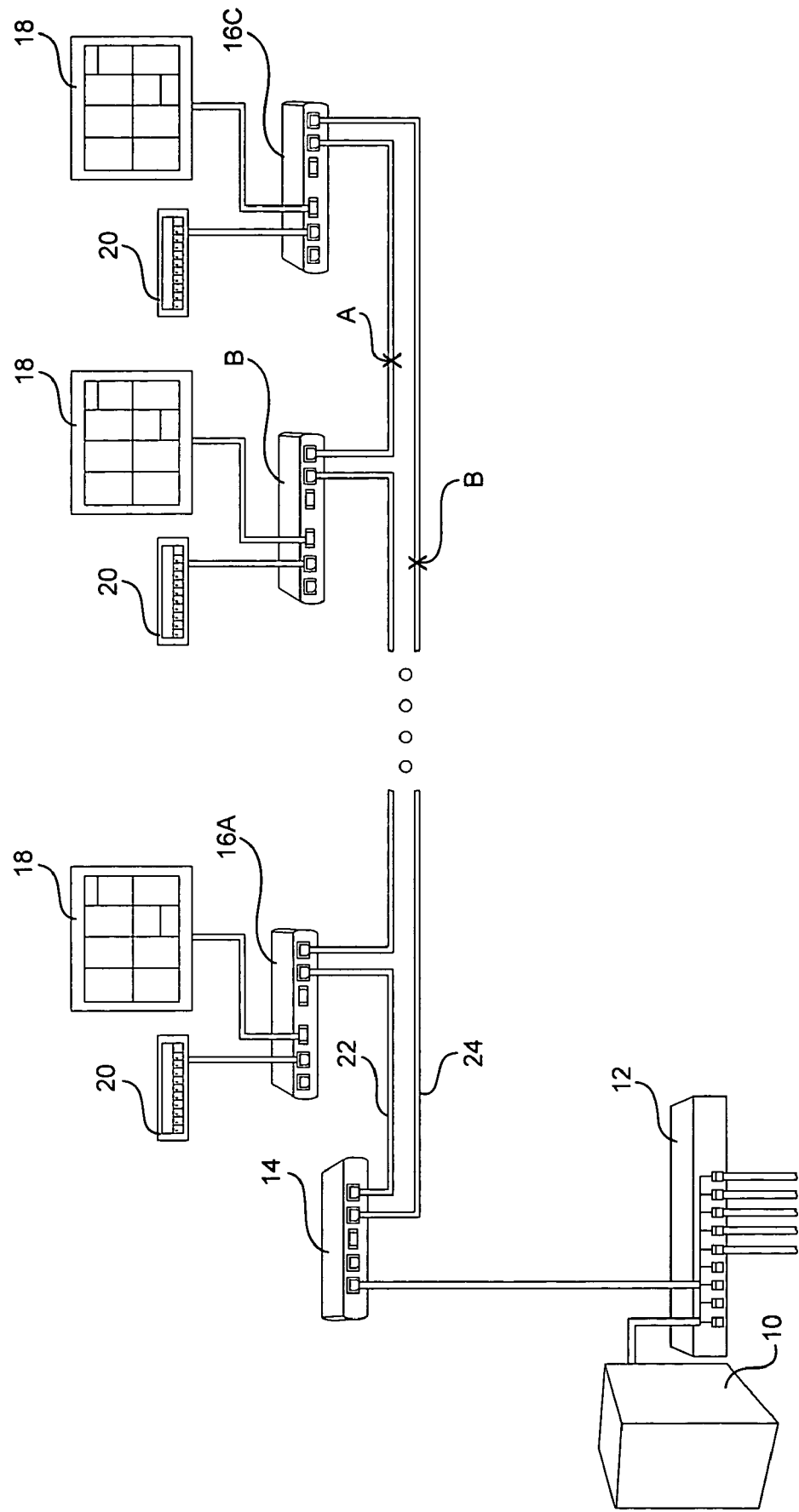
FIG. 1 is a block diagram of a conventional point-of-sale computer network system.
Figure 2:
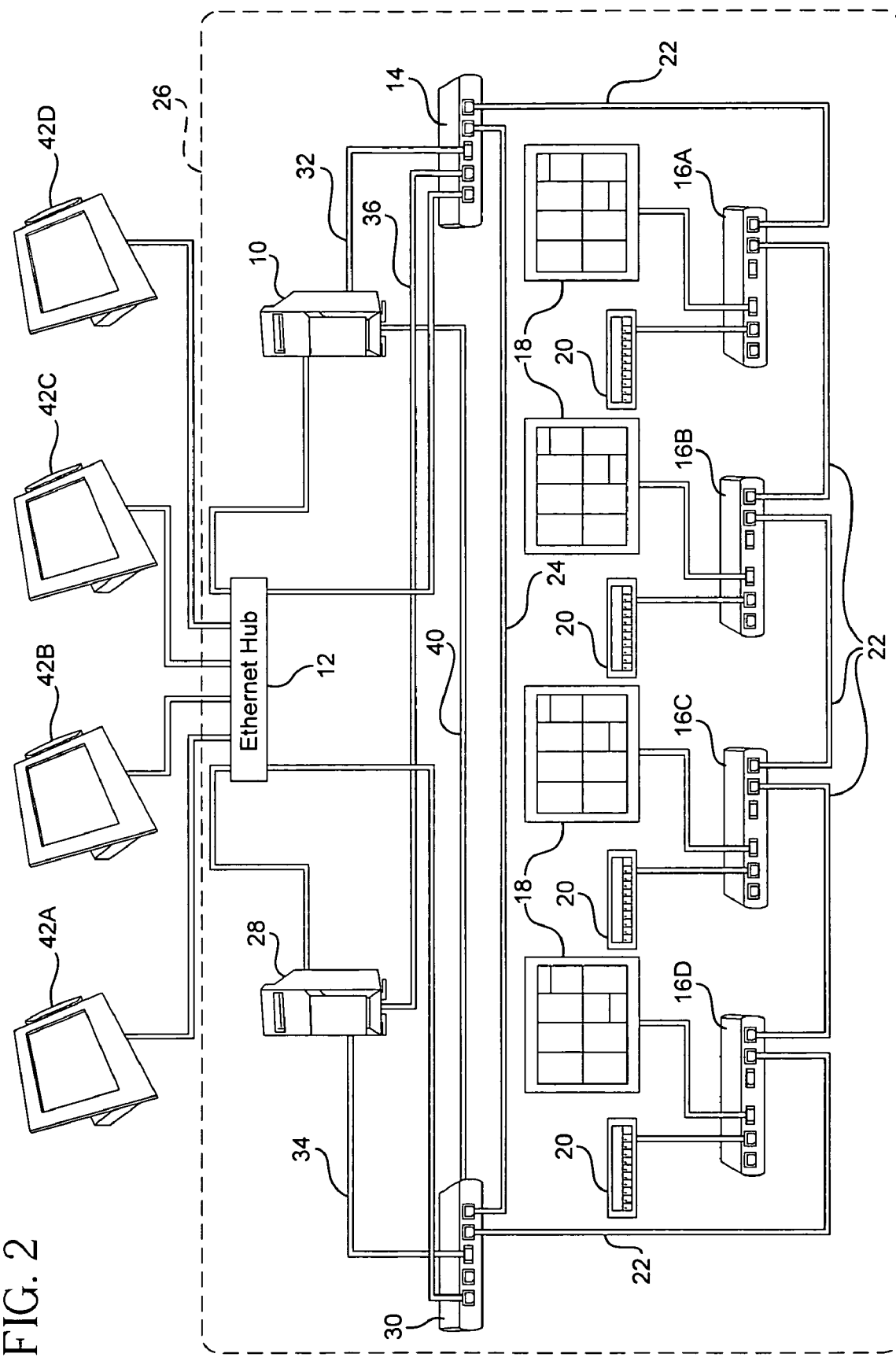
FIG. 2 is a block diagram of a computer network system in accordance with the present invention, which provides continuous operation despite the occurrence of a single point-of-failure in a communication link or malfunctions in major components of the system, such as a server, control unit, or Ethernet link.

FIG. 2 is a block diagram of a preferred embodiment of a computer network system 26 in accordance with the present invention. The system 26 is particularly adapted for use as a point-of-sale system and distributed computer network. An example of a point-of-sale system, for which further detail concerning servers, controllers, and workstations described herein, is disclosed in U.S. patent application Ser. No. 10/714,592 filed on Nov. 14, 2003, which is incorporated herein by reference.

The computer network system 26 is preferably able to continue to function despite the occurrence of a single point-of-failure in the system. For instance, failure in any one of the components, such as a server 10 or control unit 14, should not affect normal operation. This is achieved by including a secondary server 28 and a secondary control unit 30. In addition to connecting the servers 10, 28 by an Ethernet link and hub 12, the controllers or control units 14, 30 are also preferably connected to the servers 10, 28 by an RS-232, Universal Serial Bus (USB), Bluetooth, infrared, and/or radio frequency communication link 32, 34, 36, 40. Thus, even if there is a malfunction in the Ethernet link or hub 12, the system 26 will still preferably be able to continue normal uninterrupted operation.

Software in the primary server 10 preferably monitors the status of the control units 14, 30 in a continuous fashion. If the primary control unit 14 fails, the primary server 10 preferably detects this event and activates the secondary control unit 30, which will then take control of the network of workstations 16A-16D. If the primary server 10 detects that an Ethernet connection has failed, whether it be the Ethernet hub 12 or link, the primary server 10 preferably begins communication with either control unit 14, 30 through at least one of the secondary communication links 32, 34, 36, 40.

If the primary server 10 fails or its software crashes, the secondary server 28 preferably detects this event and assumes control over the system 26. Since the workstations 16A-16D are preferably connected to each of the primary control unit 14 and the secondary control unit 30 in a serial daisy-chain configuration, any single breakage of the cable connections in the workstation network will preferably not affect system operation since data will still be able to reach of the workstations 16A-16D from at least one end of the closed loop path defined by a transmit path 22 and a receive path 24. When the system 26 detects a single point-of-failure, a warning message is preferably sent to the user to enable repairs to be performed as soon as possible so that the situation can be rectified before a second failure develops.

As indicated above, FIG. 2 shows that the Ethernet hub 12 preferably provides an Ethernet link as a primary communication path between the primary server 10, primary control unit 14, secondary server 28, secondary control unit 30, and a plurality of point-of-sale terminals 42A-42D. Each of the servers 10, 28 are also preferably connected by secondary communication links 32, 34, 36, 40, such as an RS-232, Universal Serial Bus (USB), Bluetooth, infrared, and/or radio frequency communication link. The transmit path 22 preferably originates from a transmit port of the primary control unit 14, is linked to each of the workstations 16A-16D in a serial daisy-chain configuration, and terminates at a receive port of the secondary control unit 30. An output port of the secondary control unit 30 is preferably coupled to an input port of the primary control unit 14 through the receive path 24.

Despite the "transmit" and "receive" nomenclature, these ports and links are intended to be bidirectional that are preferably implemented in accordance with RS-485, but may also include an RS-232, Universal Serial Bus (USB), Bluetooth, infrared, and/or radio frequency communication link. In this way, communication is possible to and from each of the workstations 16A-16D despite the occurrence of a single point-of-failure by transmitting from either the primary control unit 14 or the secondary control unit 30. Methods and apparatuses for detecting and locating computer network discontinuities may be used in the workstation network, as further disclosed in U.S. patent application Ser. No. 10/913,194 filed Aug. 6, 2004, entitled "Diagnostic Method and Apparatus for Detecting and Locating Computer Network Discontinuities", which is incorporated herein by reference. Each of the workstations 16A-16D is also preferably coupled to a monitor 18 and a bump bar or keyboard 20.

Figure 3:
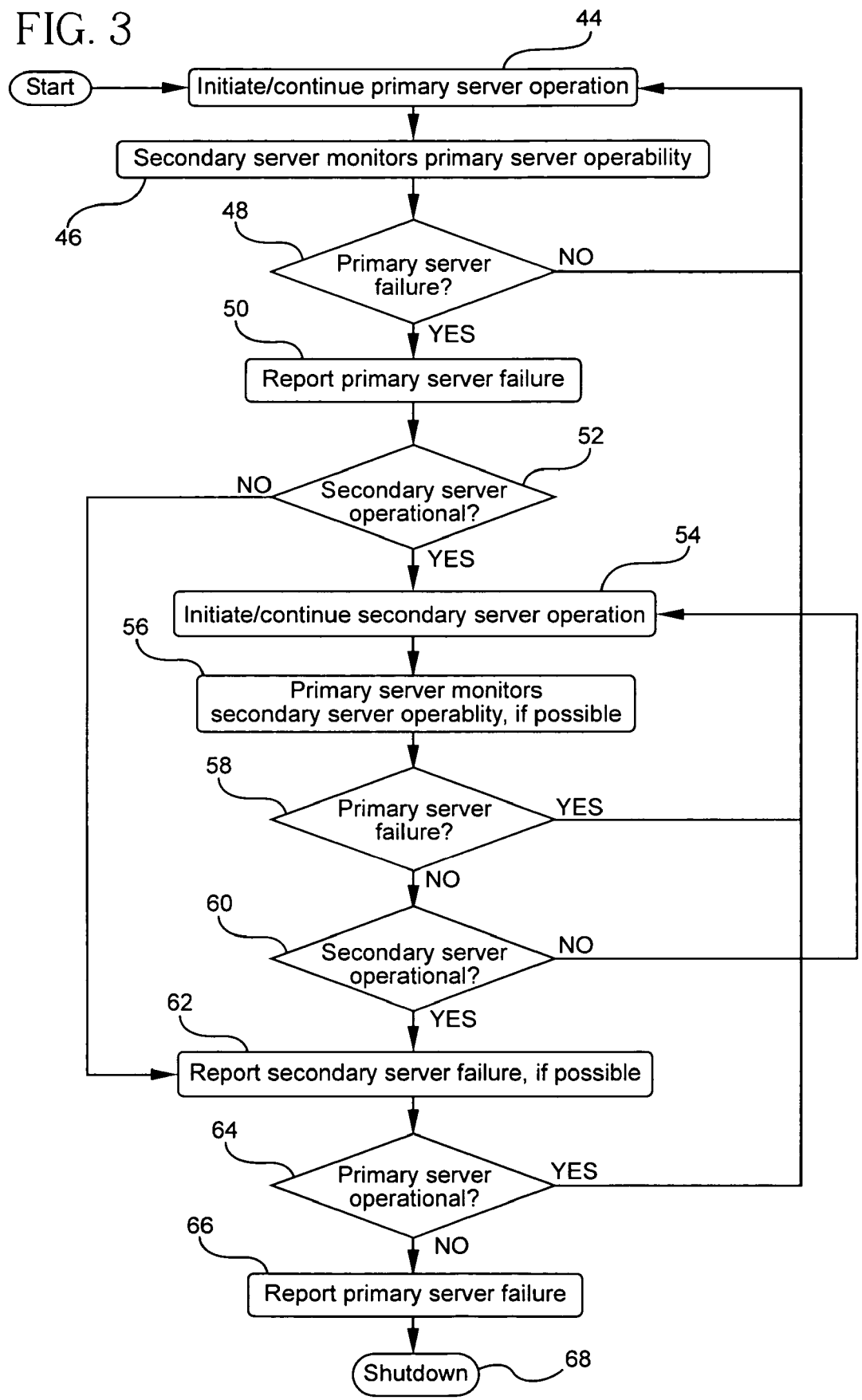
FIG. 3 is a flowchart of a routine to monitor operability of servers in the computer network system in accordance with the present invention.

FIG. 3 is a flowchart of a preferred routine to monitor operability of the primary and secondary servers in the computer network system in accordance with the present invention. Primary server operation is initiated and/or continued in step 44, and primary server operability is monitored by the secondary server in step 46. If there is a primary server failure in step 48, that failure is reported in step 50 and the operability of the secondary server is determined in step 52.

If the secondary server is found to be operational in step 52, the secondary server operation is initiated in step 54 and its operability is monitored by the primary server, if the primary server is capable of doing so, in step 56. The operability of the primary server is again verified in step 58 and, if the primary server is operational, the routine returns to step 44 to continue primary server operation. It should also be noted that as long as the primary server remains operational in step 48, the routine preferably remains in the loop defined by steps 44, 46, and 48.

If the primary server is not operational in step 58, and there is a failure in the secondary server in step 60, that failure is reported, if possible, in step 62. If the primary server is operational in step 64, the routine returns to step 44 to continue primary server operation. However, if the primary server is determined not to be operational in 64, the primary server failure is reported in step 66 and the routine proceeds to shutdown in step 68.

If, in step 52, the secondary server is determined not to be operational, a secondary server failure is reported, if possible, in step 62 and the routine preferably proceeds to step 64. It should also be noted that if the secondary server is determined to be operational (without a malfunction or failure) in step 60, the routine preferably returns to step 54 to continue secondary server operation.

Figure 4:
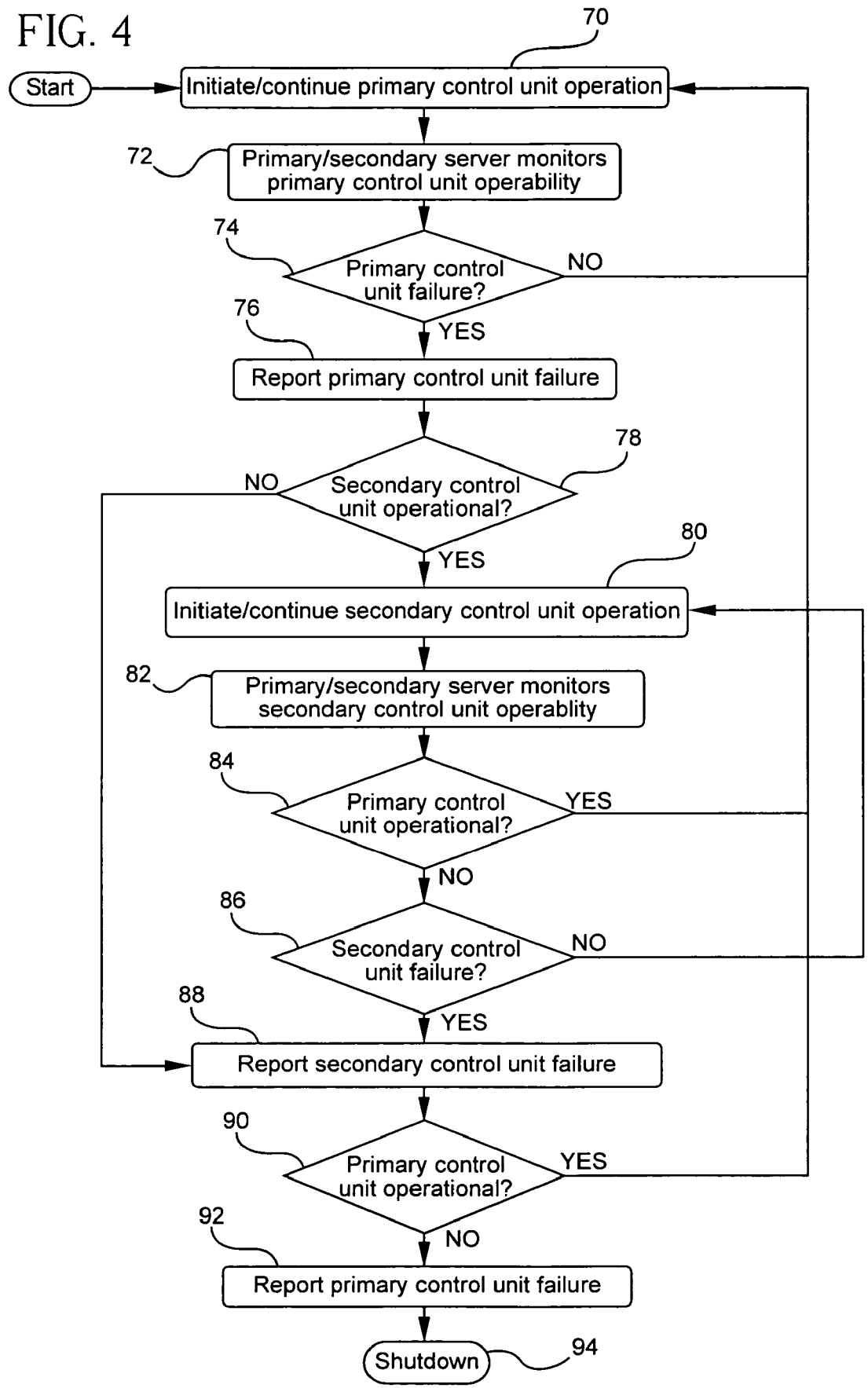
FIG. 4 is a flowchart of a routine to monitor operability of controllers or control units in the computer network system in accordance with the present invention.

FIG. 4 is a flowchart of a preferred routine to monitor operability of the controllers or control units in the computer network system in accordance with the present invention. Primary control unit operation is initiated and/or continued in step 70, and primary control unit operability is monitored by the primary or secondary server in step 72. If there is a primary control unit failure in step 74, that failure is reported in step 76 and operability of the secondary control unit is determined in step 78.

If the secondary control unit is found to be operational in step 78, the secondary control unit operation is initiated in step 80 and its operability is monitored by the primary or secondary server in step 82. The operability of the primary control unit is again verified in step 84 and, if the primary control unit is operational, the routine preferably returns to step 70 to continue primary control unit operation. It should also be noted that as long as the primary control unit remains operational in step 74, the routine preferably remains in the loop defined by steps 70, 72, and 74.

If the primary control unit is found not to be operational in step 84 and there is a failure in the secondary control unit in step 86, the secondary control unit failure is reported in step 88 and the routine proceeds to step 90. If the primary control unit is operational in step 90, the routine preferably returns to step 70 to continue primary control unit operation. However, if the primary control unit is determined not to be operational in 90, the primary control unit failure is reported in step 92 and the routine proceeds to shutdown in step 94.

If, in step 78, the secondary control unit is determined not to be operational, a secondary control unit failure is reported in step 88 and the routine preferably proceeds to step 90. It should also be noted that if the secondary control unit is determined to be operational (without a failure or malfunction) in step 86, the routine preferably returns to step 80 to continue secondary control unit operation.

Figure 5:
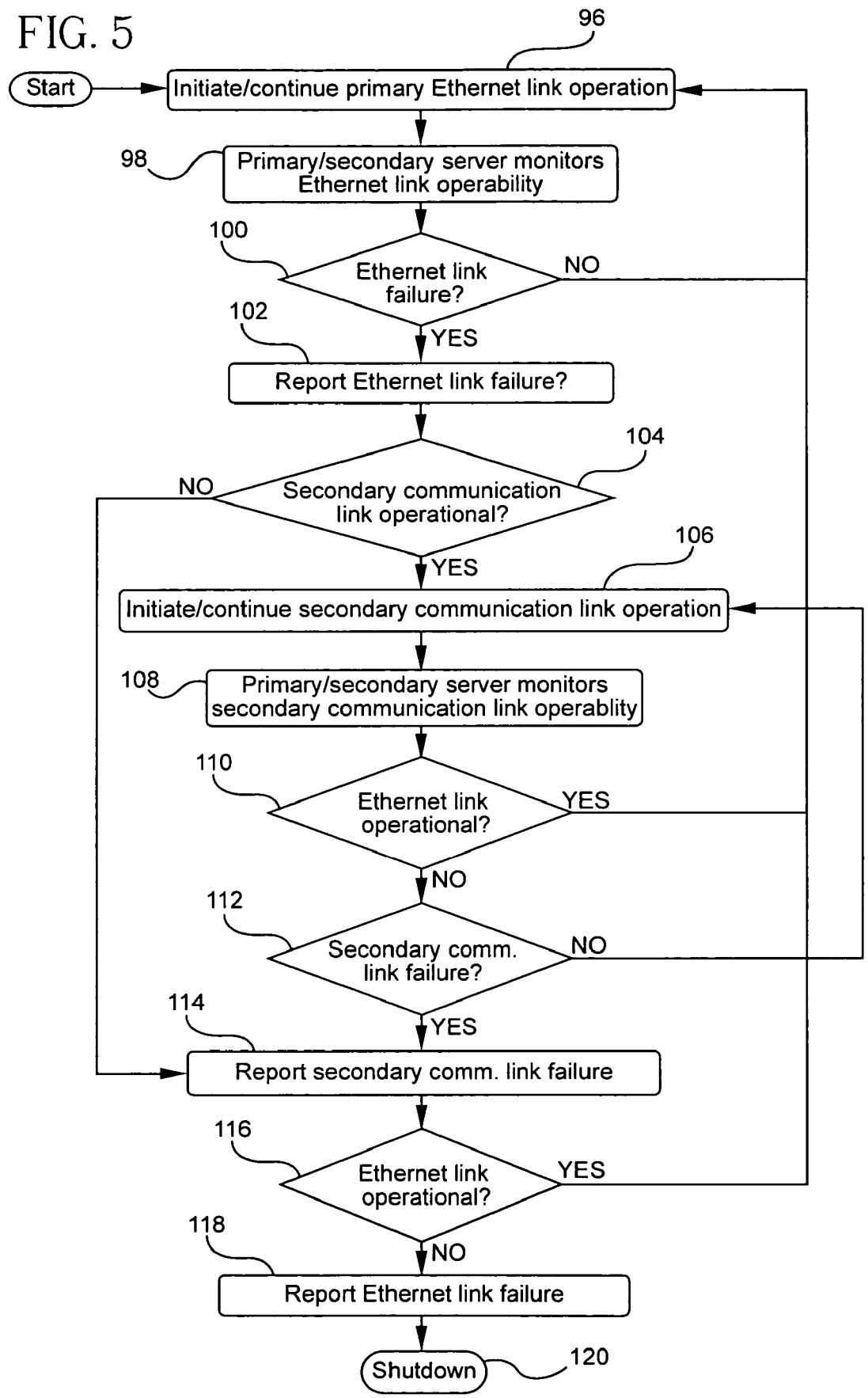
FIG. 5 is a flowchart of a routine to monitor operability of an Ethernet link in the computer network system in accordance with the present invention.

FIG. 5 is a flowchart of a preferred routine to monitor operability of the Ethernet and secondary communication links in the computer network system in accordance with the present invention. The secondary communication links are intended to include one or more of an RS-232, Universal Serial Bus (USB), Bluetooth, infrared, and/or radio frequency communication link. Ethernet link operation is initiated and/or continued in step 96, and Ethernet link operability is monitored by the primary or secondary server in step 98. If there is an Ethernet link failure in step 100, that failure is reported in step 102 and the operability of the secondary communication link is determined in step 104.

If the secondary communication link is found to be operational in step 104, the secondary communication link operation is initiated in step 106 and its operability is monitored by the primary or secondary server in step 108. The operability of the Ethernet link is again verified in step 110 and, if the Ethernet link is operational, the routine preferably returns to step 96 to continue Ethernet link operation. It should also be noted that as long as the Ethernet link remains operational in step 100, the routine preferably remains in the loop defined by steps 96, 98, and 100.

If the Ethernet link is found not to be operational in step 110 and there is a failure in the secondary communication link in step 112, the secondary communication link failure is reported in step 114. If the Ethernet link is operational in step 116, the routine returns to step 96 to continue Ethernet link operation. However, if the Ethernet link is determined not to be operational in 116, the Ethernet link failure is reported in step 118 and the routine proceeds to shutdown in step 120.

If, in step 104, the secondary communication link is determined not to be operational, a secondary communication link failure is reported in step 114 and the routine preferably continues to step 116. It should also be noted that if the secondary communication link is determined to be operational (without a failure or malfunction) in step 112, the routine preferably returns to step 106 to continue secondary communication link operation.

Figure 6:
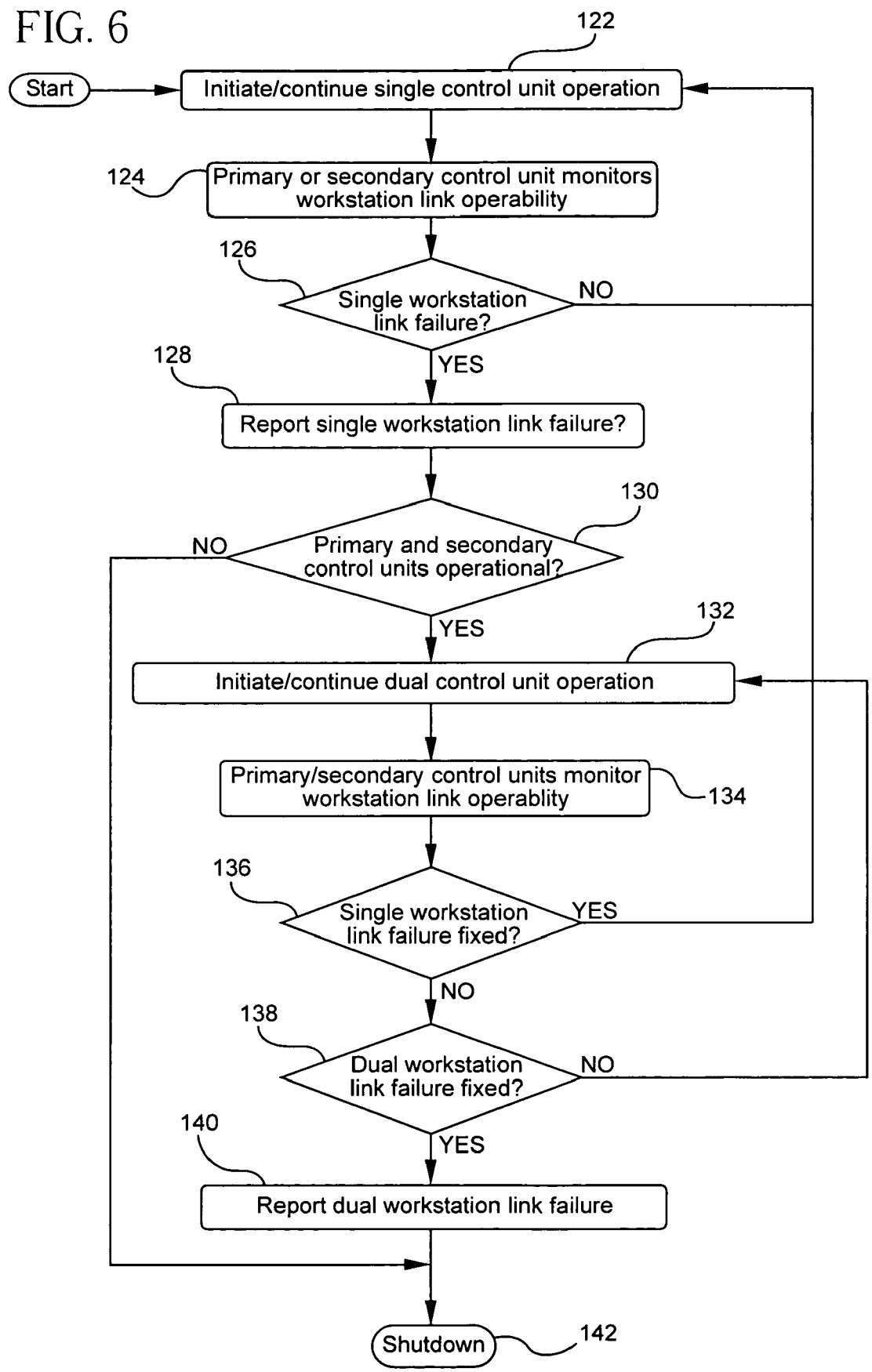
FIG. 6 is a flowchart of a routine to monitor operability of communication links between input/output control units or workstations in the computer network system in accordance with the present invention.

FIG. 6 is a flowchart of a preferred routine to monitor the operability of the communication link between workstations in the computer network system in accordance with the present invention. Single control unit operation, that is, where communication is primarily relied on by the workstations from either the primary control unit or the secondary control unit is initiated and/or continued in step 122, and either the primary or secondary control unit monitors operability of the link between the workstations in step 124.

If there is a single point-of-failure in the workstation link in step 126, that failure is reported in 128 and, if not, the routine returns to step 122 to continue single control unit operation. After reporting a failure in step 128, operability of the primary and secondary controls units is determined in step 130 and, if both are operational, dual control unit operation is initiated in step 132. In dual control unit operation, communication to the workstations is provided redundantly by both the primary and secondary control units, which ensures that each workstation receives all communication despite the occurrence of a single point-of-failure in the link between workstations.

Both primary and secondary control units preferably monitor the workstation link in step 134. If the single point-of-failure in the workstation link is determined to have been successfully repaired or otherwise eliminated in step 136, the routine preferably returns to step 122 to continue single control unit operation. If the single point-of-failure is determined not to have been successfully repaired or eliminated in step 136, the routine preferably determines whether there has been a second point-of-failure in step 138 and, if not, returns to continue dual control unit operation in step 132.

If a dual communication link failure is determined to have occurred in step 138, the routine reports the dual workstation link failure in step 140 and proceeds to shutdown in step 142. If both the primary and secondary master control units are not operational in step 130, the routine also preferably proceeds to shutdown in step 142.

Accordingly, the method and system in accordance with the present invention is able to provide uninterrupted access to all workstations in a point-of-sale system despite the occurrence of a single point-of-failure in the network or malfunctions in the server, control unit, and Ethernet link between workstations.

Although illustrative embodiments of the present invention have been described herein with reference to the accompanying drawings, it is to be understood that the invention is not limited to those precise embodiments, and that various other changes and modifications may be provided therein by one skilled in the art without departing from the scope or spirit of the invention.

What is claimed is:

1. A computer network comprising:
a first controller;
a plurality of workstations operatively coupled to the first controller in a serial daisy-chain configuration to form a first serial transmit path that extends between the first controller and a first workstation of the plurality of workstations and between each pair of successive workstations of the plurality of workstations;
a first server operatively coupled to the first controller to serve the plurality of workstations via the first controller and the first serial transmit path;
a second server operatively coupled to the first server and the first controller to serve the plurality of workstations via the first controller and the first serial transmit path in response to a failure in operation of the first server; and
a point-of-sale terminal operatively coupled to the first server and to the second server to provide point-of-sale information served by the first server or the second server to at least one workstation of the plurality of workstations via the first controller and the first serial transmit path.

2. The computer network defined by claim 1, further comprising a second controller operatively coupled to the second server, the second controller being operatively coupled to the first controller, the plurality of workstations being operatively coupled to the second controller in the serial daisy-chain configuration to form a second serial transmit path that extends between the second controller and a second workstation of the plurality of workstations and between each pair of successive workstations of the plurality of workstations, wherein the second controller assumes at least a portion of the functionality of the first controller in response to a failure in operation of the first controller, and wherein the first controller assumes at least a portion of the functionality of the second controller in response to a failure in operation of the second controller.

3. The computer network defined by claim 2, further comprising an Ethernet link, the Ethernet link operatively coupling at least two of the first server, second server, first controller, and second controller.

4. The computer network defined by claim 3, further comprising a second communication link operatively coupling the second controller and at least one of the first server and the second server, the second communication link comprising at least one of an RS-232, Universal Serial Bus (USB), Bluetooth, infrared, and radio frequency communication link, wherein communications are transmitted via the second communication link in response to a failure in operation of the Ethernet link.

5. The computer network defined by claim 2, wherein the plurality of workstations comprises at least a first workstation and a second workstation, the first controller, second controller, first workstation, and second workstation comprising a first port and a second port, the second port of the second controller being operatively coupled to the first port of the first workstation, the second port of the first workstation being operatively coupled to the first port of the second workstation, the second port of the second workstation being operatively coupled to the first port of the first controller, the second port of the first controller being operatively coupled to the first port of the second controller.

6. The computer network defined by claim 1, further comprising an Ethernet link, the Ethernet link operatively coupling at least two of the first server, second server, and first controller.

7. The computer network defined by claim 6, further comprising a first communication link operatively coupling the first controller and at least one of the first server and the second server, the first communication link comprising at least one of an RS-232, Universal Serial Bus (USB), Bluetooth, infrared, and radio frequency communication link, wherein communications are transmitted via the first communication link in response to a failure in operation of the Ethernet link.

8. The computer network defined by claim 1, further comprising a bump bar, the bump bar being operatively coupled to at least one of the plurality of workstations.

9. The computer network defined by claim 1, further comprising a monitor, the monitor being operatively coupled to at least one of the plurality of workstations.

10. A computer network comprising:
a first controller;
a second controller;
a plurality of workstations operatively coupled to the first controller in a serial daisy-chain configuration to form a first serial transmit path that extends between the first controller and a first workstation of the plurality of workstations and between each pair of successive workstations of the plurality of workstations, the plurality of workstations further operatively coupled to the second controller in the serial daisy-chain configuration to form a second serial transmit path that extends between the second controller and a second workstation of the plurality of workstations and between each pair of successive workstations of the plurality of workstations, wherein the second controller assumes at least a portion of the functionality of the first controller in response to a failure in operation of the first controller, and wherein the first controller assumes at least a portion of the functionality of the second controller in response to a failure in operation of the second controller;
a first server operatively coupled to the first controller and to the second controller to serve the plurality of workstations via the first controller and the first serial transmit path or the second controller and the second serial transmit path; and
a point-of-sale terminal operatively coupled to the first server to provide point-of-sale information served by the first server to at least one workstation of the plurality of workstations via the first controller and the first serial transmit path or the second controller and the second serial transmit path.

11. The computer network defined by claim 10, further comprising a second server operatively coupled to the first server, the first controller and the second controller, the second server configured to serve the plurality of workstations via the first controller and the first serial transmit path or the second controller and the second serial transmit path in response to a failure in operation of the first server.

12. The computer network defined by claim 11, further comprising an Ethernet link, the Ethernet link operatively coupling at least two of the first server, second server, first controller, and second controller.

13. The computer network defined by claim 12, further comprising a second communication link operatively coupling the second server and at least one of the first controller and the second controller, the second communication link comprising at least one of an RS-232, Universal Serial Bus (USB), Bluetooth, infrared, and radio frequency communication link, wherein communications are transmitted via the second communication link in response to a failure in operation of the Ethernet link.

14. The computer network defined by claim 10, further comprising an Ethernet link, the Ethernet link operatively coupling at least two of the first server, first controller, and second controller.

15. The computer network defined by claim 14, further comprising a first communication link operatively coupling the first server and at least one of the first controller and the second controller, the first communication link comprising at least one of an RS-232, Universal Serial Bus (USB), Bluetooth, infrared, and radio frequency communication link, wherein communications are transmitted via the first communication link in response to a failure in operation of the Ethernet link.

16. The computer network defined by claim 10, wherein the plurality of workstations comprises at least a first workstation and a second workstation, the first controller, second controller, first workstation, and second workstation comprising a first port and a second port, the second port of the second controller being operatively coupled to the first port of the first workstation, the second port of the first workstation being operatively coupled to the first port of the second workstation, the second port of the second workstation being operatively coupled to the first port of the first controller, the second port of the first controller being operatively coupled to the first port of the second controller.

17. The computer network defined by claim 10, further comprising a bump bar, the bump bar being operatively coupled to at least one of the plurality of workstations.

18. The computer network defined by claim 10, further comprising a monitor, the monitor being operatively coupled to at least one of the plurality of workstations.

19. A method of eliminating interruptions in the operation of a computer network due to a single point-of-failure, the method comprising the steps of:

providing a first controller;

coupling a plurality of workstations to the first controller in a serial daisy-chain configuration to form a first serial transmit path that extends between the first controller and a first workstation of the plurality of workstations and between each pair of successive workstations of the plurality of workstations;

coupling a first server to the first controller to serve the plurality of workstations via the first controller and the first serial transmit path;

coupling a second server to the first server and to the first controller to serve the plurality of workstations via the first controller and the first serial transmit path in response to a failure in operation of the first server; and coupling a point-of-sale terminal to the first server and the second server to provide point-of-sale information served by the first server or the second server to at least one workstation of the plurality of workstations via the first controller and the first serial transmit path.

20. The method of eliminating interruptions in the operation of a computer network due to a single point-of-failure defined by claim 19, further comprising the steps of:

coupling a second controller to the second server;

coupling the second controller to the first controller; and coupling the plurality of workstations to the second controller in the serial daisy-chain configuration to form a second serial transmit path that extends between the second controller and a second workstation of the plurality of workstations and between each pair of successive workstations of the plurality of workstations, wherein the second controller assumes at least a portion of the functionality of the first controller in response to a failure in operation of the first controller, and wherein the first controller assumes at least a portion of the functionality of the second controller in response to a failure in operation of the second controller.

21. The method of eliminating interruptions in the operation of a computer network due to a single point-of-failure defined by claim 20, further comprising the step of coupling an Ethernet link between at least two of the first server, second server, first controller, and second controller.

22. The method of eliminating interruptions in the operation of a computer network due to a single point-of-failure defined by claim 21, further comprising the steps of:

coupling a second communication link between the second controller and at least one of the first server and the second server, the second communication link comprising at least one of an RS-232, Universal Serial Bus (USB), Bluetooth, infrared, and radio frequency communication link; and monitoring operation of the Ethernet link, wherein communications are transmitted via the second communication link in response to a failure in operation of the Ethernet link.

23. The method of eliminating interruptions in the operation of a computer network due to a single point-of-failure defined by claim 20, wherein the plurality of workstations comprises at least a first workstation and a second workstation, the first controller, second controller, first workstation, and second workstation comprising a first port and a second port, the method further comprising the steps of:

coupling the second port of the second controller to the first port of the first workstation;

coupling the second port of the first workstation to the first port of the second workstation;

coupling the second port of the second workstation to the first port of the first controller; and coupling the second port of the first controller to the first port of the second controller.

24. The method of eliminating interruptions in the operation of a computer network due to a single point-of failure defined by claim 20, further comprising the step of monitoring the operation of at least one of the first controller, second controller, first server, and second server by at least one of the first server and the second sewer.

25. The method of eliminating interruptions in the operation of a computer network due to a single point-of failure defined by claim 20, further comprising the step of reporting a failure in operation of at least one of the first server, second server, first controller, and second controller to a user.

26. The method of eliminating interruptions in the operation of a computer network due to a single point-of-failure defined by claim 19, further comprising the step of coupling an Ethernet link between at least two of the first server, second server, and first controller.

27. The method of eliminating interruptions in the operation of a computer network due to a single point-of-failure defined by claim 26, further comprising the steps of:

coupling a first communication link between the first controller and at least one of the first server and the second server, the first communication link comprising at least one of an RS-232, Universal Serial Bus (USB), Bluetooth, infrared, and radio frequency communication link; and monitoring operation of the Ethernet link, wherein communications are transmitted via the first communication link in response to a failure in operation of the Ethernet link.

28. A method of eliminating interruptions in the operation of a computer network due to a single point-of failure, the method comprising the steps of:

providing a first controller;

coupling a second controller to the first controller; and coupling a plurality of workstations to the first controller in a serial daisy-chain configuration to form a first serial transmit path that extends between the first controller and a first workstation of the plurality of workstations and between each pair of successive workstations of the plurality of workstations;

coupling the plurality of workstations to the second controller in the serial daisy-chain configuration to form a second serial transmit path that extends between the second controller and a second workstation of the plurality of workstations and between each pair of successive workstations of the plurality of workstations, wherein the second controller assumes at least a portion of the functionality of the first controller in response to a failure in operation of the first controller, and wherein the first controller assumes at least a portion of the functionality of the second controller in response to a failure in operation of the second controller;

coupling a first sewer to the first controller and the second controller to serve the plurality of workstations via the first controller and the first serial transmit path or the second controller and the second serial transmit path; and coupling a point-of-sale terminal to the first server to provide point-of-sale order information served by the first server to at least one work station of the plurality of workstations via the first controller and the first serial transmit path or the second controller and the second serial transmit path.

29. The method of eliminating interruptions in the operation of a computer network due to a single point-of-failure defined by claim 28, further comprising the steps of:
coupling a second server to the first server; and
coupling the second server to the first controller and the second controller, wherein the second server serves the plurality of workstations via the first controller and the first serial transmit path or the second controller and the second serial transmit path in response to a failure in operation of the first server.

30. The method of eliminating interruptions in the operation of a computer network due to a single point-of failure defined by claim 29, further comprising the step of coupling an Ethernet link between at least two of the first server, second server, first controller, and second controller.

31. The method of eliminating interruptions in the operation of a computer network due to a single point-of-failure defined by claim 30, further comprising the steps of:
coupling a second communication link between the second server and at least one of the first controller and the second controller, the second communication link comprising at least one of an RS-232, Universal Serial Bus (USB), Bluetooth, infrared, and radio frequency communication link; and
monitoring operation of the Ethernet link, wherein communications are transmitted via the second communication link in response to a failure in operation of the Ethernet link.

32. The method of eliminating interruptions in the operation of a computer network due to a single point-of-failure defined by claim 29, further comprising the step of monitoring the operation of at least one of the first controller, second controller, first server, and second server by at least one of the first server and the second server.

33. The method of eliminating interruptions in the operation of a computer network due to a single point-of-failure defined by claim 29, further comprising the step of reporting a failure in operation of at least one of the first server, second server, first controller, and second controller to a user.

34. The method of eliminating interruptions in the operation of a computer network due to a single point-of failure defined by claim 28, further comprising the step of coupling an Ethernet link between at least two of the first server, first controller, and second controller.

35. The method of eliminating interruptions in the operation of a computer network due to a single point-of-failure defined by claim 34, further comprising the steps of:
coupling a first communication link between the first server and at least one of the first controller and the second controller, the first communication link comprising at least one of an RS-232, Universal Serial Bus (USB), Bluetooth, infrared, and radio frequency communication link; and
monitoring operation of the Ethernet link, wherein communications are transmitted via the first communication link in response to a failure in operation of the Ethernet link.

36. The method of eliminating interruptions in the operation of a computer network due to a single point-of-failure defined by claim 28, wherein the plurality of workstations comprises at least a first workstation and a second workstation, the first controller, second controller, first workstation, and second workstation comprising a first port and a second port, the method further comprising the steps of:
coupling the second port of the second controller to the first port of the first workstation;
coupling the second port of the first workstation to the first port of the second workstation;
coupling the second port of the second workstation to the first port of the first controller; and
coupling the second port of the first controller to the first port of the second controller.

* * * * *